United States Patent Office 3,283,553
Patented Nov. 8, 1966

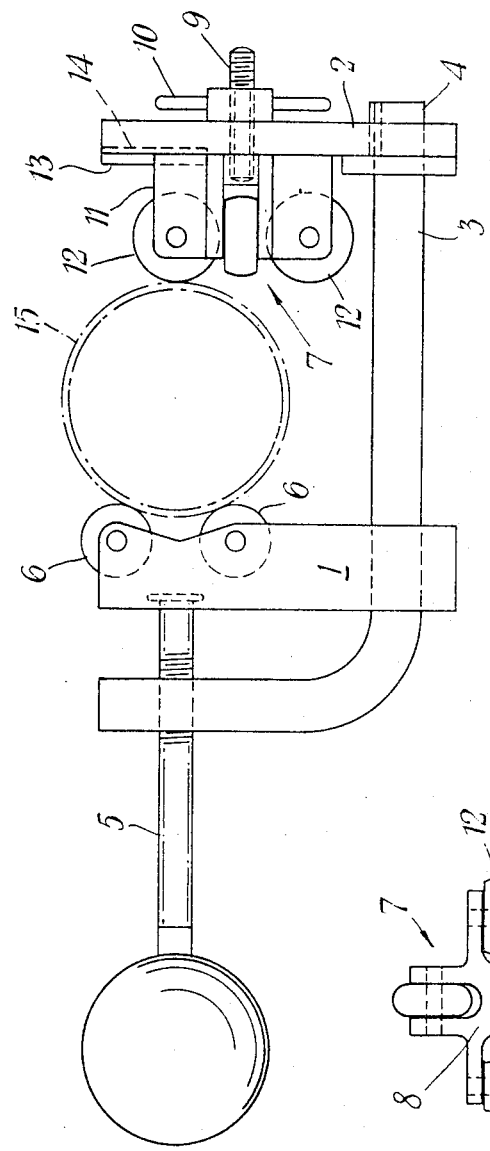
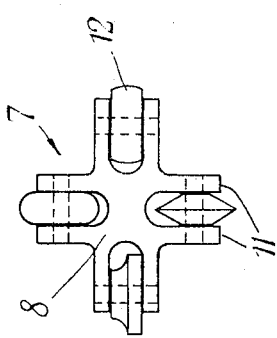

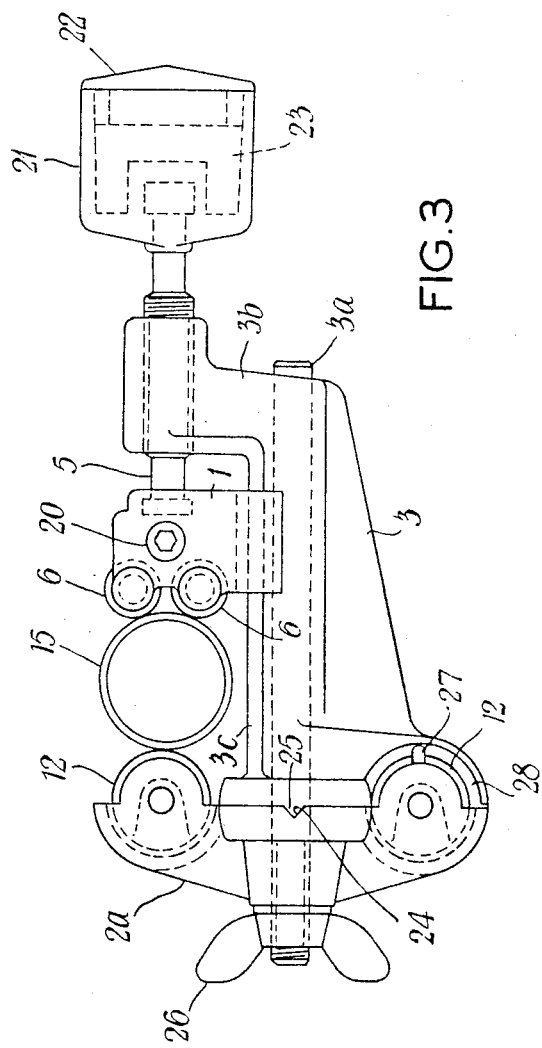

3,283,553
MULTI-PURPOSE TOOLS
George O. Taylor, Guilford, England, assignor to The British Aluminium Company Limited, London, England, a company of Great Britain
Filed July 21, 1964, Ser. No. 384,159
Claims priority, application Great Britain, July 31, 1963, 30,372/63
13 Claims. (Cl. 72—116)

This invention relates to improvements in multipurpose tools.

It is an object of the present invention to provide an improved multipurpose tool which shall be portable and usable on site to perform a selected one of a number of operation on a hollow tube.

According to the present invention, a multipurpose tool comprises a plurality of rotatable wheels each capable of separately performing an operation on a hollow tube and each mounted on a turret at intervals about an axis about which the turret is angularly adjustable to bring a selected one of the wheels to an operating location, the axes of the wheels being contained in one or more planes normal to the turret axis and at least two idling rollers mounted with their axes substantially parallel to and spaced from the wheel axes to define with that wheel at the operation location a space in which is intended to be received and located a hollow tube with its axis parallel to the wheel axes.

Preferably, the idling rollers are displaceable relative to the wheels to accommodate hollow tubes of different diameters.

Advantageously, keying means is provided to locate the turret in each angularly adjusted position in which a wheel is presented at the operating location.

Two embodiments of the invention will now be described by way of example, reference being made to the accompanying drawings in which:

FIG. 1 is a front elevational view of a multipurpose tool according to the present invention, FIG. 2 is a side elevational view of a part of the tool shown in FIG. 1, and FIG. 3 is a rear elevational view of a modified tool.

The tool illustrated in FIGS. 1 and 2 comprises a pair of parallel jaws 1 and 2 carried on an L-shaped frame member 3 of rectangular cross-section. The jaw 2 is fixedly carried on the free end of the member 3 which free end is threaded to accommodate a nut 4 which holds the jaw 2 in position. The jaw 1 is displaceably carried on the member 3 by means of an adjusting screw 5 which engages the jaw 1 and also threadly engages the upright of the member 3 so that the angular adjustment of the screw 5 moves the jaw 1 towards or away from the jaw 2. The jaw 1 carries a pair of idling rollers 6 disposed with their axes parallel and normal to the direction of displacement of the jaw 1 and spaced from each other in a direction normal to their axes and to the direction of displacement of the jaw 1. The jaw 2 carries a turret indicated generally at 7. The turret 7 has a solid centre portion 8 in which is threadedly engaged a pivot pin 9 which extends through the jaw 2 and is secured by a wing nut 10 or the like to define an axis about which the turret 7 is angularly adjustable, this axis being parallel to the direction of displacement of the jaw 1. The turret 7 has four pairs of arms 11 extending outwardly from the center portion 8 at 90° intervals around the adjustment axis of the turret 7. A separate operating wheel 12 is rotatably mounted between each pair of arms 11, the axes of the wheels 12 being parallel to the axes of the idling rollers 6 and being contained in one or more planes normal to the turret axis. The turret 7 is angularly adjustable about its axis to present a selected one of the operating wheels 12 to the operating location at which locations the axis of the selected wheel 12 is contained in a plane parallel to the turret axis and disposed substantially midway between the two corresponding planes in which the axes of the idling rollers 6 are respectively contained. A key 13 is provided to locate the turret 7 in each angular position in which an operating wheel 12 is presented to the operating location, this key 13 sliding in a groove 14 in the jaw 2 and extending between the pair of arms 11 associated with that operating wheel 12 intended to be located in the operating position.

The wheels 12 have peripheries shaped in accordance with the operation they are to perform on a hollow tube. Thus one wheel 12 may be a cutting wheel having a sharp periphery. A second wheel 12 may be shaped to swage the end of a tube, a third wheel may have a rounded periphery for the formation of an annular groove in the wall of a hollow tube and a fourth wheel may have its periphery shaped to knurl the external surface of a hollow tube.

In the operation of the tool described, the wing nut 10 is unscrewed for a fraction of a turn, the key 13 is withdrawn from the groove 14 and the turret 7 is rotated to present the selected wheel 12 at the operating location. The key 13 is then inserted in the groove 14 to extend between the appropriate pair of arms 11 and the wing nut 10 is made tight. A hollow tube (shown at 15) is then supported between the idling rollers 6 and the selected wheel 12 with its axis parallel to the axes of the wheels 12. The adjusting screw 5 is turned to move the jaw 1 towards the jaw 2 to urge the wall of the tube 15 against the selected wheel 12 which deforms the tube wall or cuts into its according to which wheel 12 is selected. The tube 15 is then rotated about its axis so that the deformation or cutting action is carried out for a full 360° if so desired.

The tool described is portable and usable on site to perform such operations as may be desired. Thus a workman may use such a tool to cut tube into desired lengths using the appropriate cutting wheel 12 and then, using the grooving wheel 12, form grooves in the tube wall for locating and fixing of connector pieces.

The tool illustrated in FIG. 3 is similar in many respects to that illustrated in FIG. 1 and like reference numerals are used to denote like parts. In this case, the L-shaped frame member 3 is formed from a steel bar 3a which is threaded at one end and which has the remainder 3b of the frame 3 cast thereon to leave the threaded end of the bar 3a protruding. The part 3b of the frame is cast in any suitable material such as, for example, an aluminium alloy and is formed with a pair of longitudinally extending ribs 3c which engage in a groove formed in the lower end of the displaceable jaw 1 to locate the jaw 1 and hold it against rotation about the axis of the adjusting screw 5. The displaceable jaw 1 is formed in two parts secured together by a nut and bolt 20 with the idling rollers 6 therebetween. The head 21 of the adjusting screw 5 is formed hollow and has a plug cap 22 defining a chamber 23 which can house a spare operating wheel 12.

The fixed jaw 2 and turret 7 of the previous example are, in this case, replaced by twin-wheel turret 2a carried on the threaded end of the bar 3a and having two operating wheels 12 located at diametrically opposite positions with respect to the axis of the bar 3a. The turret 2a is rotatable on the bar 3a to bring either wheel 12 to the operation position in which it is located by notches 24 formed in the turret 2a and receiving projections 25 formed on the frame part 3b. A nut 26 threadedly engages the threaded end of the bar 3a to urge the notches 24 and projections 25 into engagement and locate a wheel 12 in the operating position and hold the turret 2a against rotation. In order to bring the other wheel 12 to the operative position, the nut 26 is unscrewed to an extent sufficient to allow the notches 24 to be disengaged from the projections 25, the turret 2a is rotated through 180° and the nut 26 is tightened to bring the notches 24 and projections 25 into engagement. If desired, spring means may be provided to urge the turret 2a to the released position when the nut 26 is unscrewed.

In the example illustrated in FIG. 3, the upper wheel 12 is a cutting wheel and the lower wheel 12 is a grooving wheel. Associated with the grooving wheel 12 is a spring-urged tongue 27 spaced a short distance, e.g. one quarter of an inch from the medial plane of the grooving wheel. The purpose of this tongue 12 (which can be pushed inwardly against a spring) is to engage in a previously formed groove in the tube 15 (where provided) so that the groove to be formed by the wheel 12 is located with respect thereto. The tongue 27 may, of course, merely abut against the end of the tube 15 to locate the grooving wheel 12 with respect thereto.

It will be observed that the housing part 3b is so formed as at 28 to form a shield for this wheel 12 which is in the inoperative position.

I claim:
1. A multipurpose tool comprising a plurality of rotatable wheels each capable of separately performing an operation on a hollow tube, a turret carrying said wheels at intervals about an axis about which the turret is angularly adjustable to bring a selected one of the wheels to an operating location, the axes of the wheels being each contained in a plane normal to the turret axis and at least two idling rollers mounted with their axes substantially parallel to and spaced from the wheel axes to define, with that wheel at the operating location, a space in which is intended to be received and located a hollow tube with its axis parallel to the wheel axes.

2. A multipurpose grooving tool according to claim 1 wherein the idling rollers are mounted for displacement relative to the wheels to accommodate hollow tubes of different diameters.

3. A multipurpose tool comprising a frame, a turret carried on said frame and angularly adjustable about a first axis, a plurality of rotatable wheels each mounted on said turret and disposed at intervals about said first so as to be presentable to an operating location by angular adjustment of said turret, the axes of said wheels being each contained in a plane normal to said first axis, a jaw displaceably carried on said frame and at least two idling rollers carried on said jaw with their axes substantially parallel to and spaced from the wheel axes to define, with that wheel presented at the operating location, a space in which is intended to be received and located a hollow tube with its axis parallel to the wheel axes, said space being adjustable to accommodate tubes of different diameters by displacement of said jaw.

4. A tool according to claim 3 wherein said jaw and said frame have complementary guide formations guiding displacement of said jaw in the direction of said first axis and including a threaded member engaging said jaw and threadedly engaging said frame to control the displacement of said jaw.

5. A tool according to claim 3 including keying means operable to locate said turret in each angularly adjusted position of said turret in which a wheel is presented to said operating location.

6. A tool according to claim 3 including a threaded member carried on said frame and engaged with said turret to define said first axis and operable to secure said turret in and release it from each position in which a wheel is presented at the operating location.

7. A tool according to claim 3 in which said wheels comprise at least a cutting wheel and a grooving wheel.

8. A tool according to claim 7 in which a spring urged tongue is carried on said turret in association with said grooving wheel to locate said grooving wheel relative to a preformed formation on a hollow tube when in the operative position.

9. A tool according to claim 3 in which the axis of each of said wheels, when at the operating location is contained in a plane parallel to said first axis and substantially midway between the two corresponding planes in which the axes of said idling rollers are respectively contained.

10. A multipurpose tool comprising a frame, a turret, a first threaded member connecting said turret to said frame for angular adjustment about a first axis, a plurality of rotatable operating wheels each carried by said turret at intervals about said first axis and presentable to an operating location by angular adjustment of said turret, the axes of said wheels being each contained in a plane normal to said first axis, key means engageable with said turret to locate said turret in each angularly adjusted position in which one of said wheels is presented at said operating location, a jaw mounted on said frame for displacement in the direction of said first axis, a second threaded member engaging said jaw and threadedly engaging said frame to control displacement of said jaw in said direction and at least two idling rollers carried on said jaw with their axes substantially parallel to and spaced from the wheel axes to define, with that wheel presented at the operating location, a space in which is intended to be received and located a hollow tube with this axis parallel to the wheel axes, said space being adjustable to accommodate tubes of different diameters by displacement of said jaw.

11. A tool according to claim 10 wherein said key means comprises complementary formations on said frame and said turret engageable in each angularly adjusted position of said turret in which one of said wheels is presented at said operating location.

12. A tool according to claim 10 wherein said turret is formed with four pairs of arms extending outwardly from said first axis at 90° intervals therearound and each operating wheel is rotatably mounted between a pair of arms.

13. A tool according to claim 10 in which two wheels are provided one at each of two locations diametrically opposed with respect to said first axis.

No references cited.

RICHARD H. EANES, JR., *Primary Examiner.*